(12) United States Patent
Hoversten et al.

(10) Patent No.: US 12,334,801 B2
(45) Date of Patent: Jun. 17, 2025

(54) SUPPLY GENERATOR / SUPPLY MODULATOR WITH SWITCHED-CAPACITOR DRIVE SUPPLY

(71) Applicant: Murata Manufacturing Co., Ltd., Kyoto (JP)

(72) Inventors: John R. Hoversten, Arlington, MA (US); David J. Perreault, Cambridge, MA (US); Yevgeniy A. Tkachenko, Belmont, MA (US); Aaron Cook, Deerfield, NH (US); Kapil Kesarwani, Bedford, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 243 days.

(21) Appl. No.: 17/820,978

(22) Filed: Aug. 19, 2022

(65) Prior Publication Data
US 2023/0057037 A1    Feb. 23, 2023

Related U.S. Application Data

(60) Provisional application No. 63/235,389, filed on Aug. 20, 2021.

(51) Int. Cl.
*H02M 3/07*    (2006.01)
*H02M 1/00*    (2006.01)
*H02M 3/158*   (2006.01)

(52) U.S. Cl.
CPC ....... *H02M 1/0006* (2021.05); *H02M 1/0095* (2021.05); *H02M 3/07* (2013.01); *H02M 3/158* (2013.01)

(58) Field of Classification Search
CPC ............... H02M 1/0006; H02M 1/08; H02M 3/07–078; H02M 1/0095; H03F 1/0227; H03K 17/56; H03K 17/687
See application file for complete search history.

(56) References Cited

U.S. PATENT DOCUMENTS

| | | |
|---|---|---|
| 7,746,041 B2 | 6/2010 | Xu et al. |
| 7,777,459 B2 | 8/2010 | Williams |
| (Continued) | | |

OTHER PUBLICATIONS

PCT International Search Report and Written Opinion dated Nov. 8, 2022 for International Application No. PCT/US2022/040856; 10 pages.
(Continued)

*Primary Examiner* — Alex Torres-Rivera
(74) *Attorney, Agent, or Firm* — DALY, CROWLEY, MOFFORD & DURKEE, LLP

(57) ABSTRACT

A circuit configured to receive a first and second voltages and generate an output voltage, the circuit comprising: a first capacitor configured to charge to a voltage equal a difference between the first voltage and the output voltage; a second capacitor configured to charge to a voltage equal to a difference between the first voltage and the second voltage; and a plurality of conductive paths coupled to the first and second capacitors. In a first state, the conductive paths are configured to cause the second capacitor to charge to the voltage equal to the difference between the first voltage and the second voltage. In a second state, the conductive paths are configured to cause the second capacitor to be connected in parallel with the first capacitor to cause the first capacitor to charge to the voltage equal to the difference between the first voltage and the output voltage.

18 Claims, 11 Drawing Sheets

(56) References Cited

U.S. PATENT DOCUMENTS

| | | |
|---|---|---|
| 7,782,027 B2 | 8/2010 | Williams |
| 7,786,712 B2 | 8/2010 | Williams |
| 7,812,579 B2 | 10/2010 | Williams |
| 7,977,927 B2 | 7/2011 | Williams |
| 8,212,541 B2 | 7/2012 | Perreault et al. |
| 8,824,978 B2 | 9/2014 | Briffa et al. |
| 8,829,993 B2 | 9/2014 | Briffa et al. |
| 8,830,709 B2 | 9/2014 | Perreault et al. |
| 8,830,710 B2 | 9/2014 | Perreault et al. |
| 8,860,396 B2 | 10/2014 | Giuliano |
| 8,957,727 B2 | 2/2015 | Dawson et al. |
| 9,020,453 B2 | 4/2015 | Briffa et al. |
| 9,160,287 B2 | 10/2015 | Briffa et al. |
| 9,166,536 B2 | 10/2015 | Briffa et al. |
| 9,172,336 B2 | 10/2015 | Briffa et al. |
| 9,209,758 B2 | 12/2015 | Briffa et al. |
| 9,490,752 B2 | 11/2016 | Briffa et al. |
| 9,531,291 B2 | 12/2016 | Perreault |
| 9,537,456 B2 | 1/2017 | Briffa et al. |
| 9,755,672 B2 | 9/2017 | Perreault et al. |
| 9,768,731 B2 | 9/2017 | Perreault et al. |
| 9,768,732 B2 | 9/2017 | Briffa et al. |
| 9,917,517 B1 | 3/2018 | Jiang et al. |
| 9,979,421 B2 | 5/2018 | Astrom et al. |
| 10,164,577 B2 | 12/2018 | Briffa et al. |
| 10,193,441 B2 | 1/2019 | Giuliano |
| 10,389,235 B2 | 8/2019 | Giuliano |
| 10,547,241 B1* | 1/2020 | Li .................. H02M 3/1588 |
| 10,658,981 B2 | 5/2020 | Briffa et al. |
| 10,992,265 B2 | 4/2021 | Hoversten et al. |
| 11,191,028 B2 | 11/2021 | Hoversten et al. |
| 11,245,367 B2 | 2/2022 | Garrett et al. |
| 11,637,531 B1 | 4/2023 | Perreault et al. |
| 11,664,727 B2 | 5/2023 | Giuliano et al. |
| 11,736,010 B2 | 8/2023 | Giuliano et al. |
| 11,757,410 B2 | 9/2023 | Hoversten et al. |
| 2009/0108908 A1* | 4/2009 | Yamadaya ......... H02M 3/1588 327/390 |
| 2013/0177106 A1* | 7/2013 | Levesque ............. H03F 1/0261 375/297 |
| 2014/0268946 A1* | 9/2014 | Liu .................... H02M 3/07 363/60 |
| 2018/0097486 A1 | 4/2018 | Salem et al. |
| 2018/0219476 A1 | 8/2018 | Kain |
| 2020/0099367 A1* | 3/2020 | Bodano ............... H02M 1/08 |
| 2021/0044203 A1 | 2/2021 | Low et al. |
| 2021/0099137 A1* | 4/2021 | Drogi ................... H03F 3/72 |
| 2021/0288614 A1 | 9/2021 | Hoversten et al. |
| 2021/0385752 A1 | 12/2021 | Hoversten et al. |
| 2022/0103066 A1 | 3/2022 | Chen et al. |
| 2022/0131463 A1 | 4/2022 | Giuliano et al. |
| 2022/0149725 A1 | 5/2022 | Garrett et al. |
| 2023/0054485 A1 | 2/2023 | Hoversten et al. |
| 2023/0056740 A1 | 2/2023 | Perreault et al. |

OTHER PUBLICATIONS

Cao, et al.; "A Family of Zero Current Switching Switched-Capacitor DC-DC Converters"; 2010 Twenty-Fifth Annual IEEE Applied Power Electronics Conference and Exposition (APEC); Feb. 21-25, 2010; 8 Pages.

Cao, et al.; "Multiphase Multilevel Modulator DC-DC Converter for High-Current High-Gain TEG Application"; IEEE Transactions on Industry Application; vol. 47; No. 3; May/Jun. 2011; 9 Pages.

Chen, et al; "A High Efficiency High Power Step-Up Resonant Switched-Capacitor"; 2012 IEEE Energy Conversion Congress and Exposition (ECCE); Sep. 15-20, 2012; 5 Pages.

Shoyama, et al.; "Resonant Switched Capacitor Converter with High Efficiency"; 2004 35$^{th}$ Annual IEEE Power Electronics Specialists Conference; 2004; 7 Pages.

Sun, et al.; "High Power Density, High Efficiency System Two-Stage Power Architecture for Laptop Computers"; 2006 37th IEEE Power Electronics Specialists Conference; Jun. 18-22, 2006; 7 Pages.

Unknown; "Fundamentals of Power Electronics"; Chapter 19: Resonant Conversion; Sep. 19, 2019; 87 Pages.

Yeung, et al.; "Multiple and Fractional Voltage Conversion Ratios for Switched-capacitor Resonant Converters"; 2001 IEEE 32nd Annual Power Electronics Specialists Conference (IEEE Cat. No. 01CH37230); Jun. 17-21, 2001; 6 Pages.

* cited by examiner

SUPPLY GENERATOR / SUPPLY MODULATOR WITH SWITCHED-CAPACITOR DRIVE SUPPLY

CROSS REFERENCE TO RELATED APPLICATION

This application claims the benefit of U.S. Provisional Patent Application Ser. No. 63/235,389 entitled "SUPPLY GENERATOR/SUPPLY MODULATOR WITH SWITCHED-CAPACITOR DRIVE SUPPLY," filed on Aug. 20, 2021, the entire contents of which are hereby incorporated by reference as if fully set forth herein.

BACKGROUND

As is known in the art, radio-frequency (rf) power amplifiers (PAs) are a significant consumer of power in rf systems including wireless rf systems (e.g., a cell phone or base station). The efficiency (both the power efficiency (PE) an power added efficiency (PAE) of rf PAs can be improved through "supply modulation" (or "drain modulation" or "collector modulation"), in which a power supply voltage provided to the PA is adjusted (or "modulated") over time depending upon the characteristics of an rf signal being provided to an rf input of the PA. To achieve relatively large efficiency improvements, supply voltage can be adjusted discretely (i.e. among a discrete number of voltage levels) or adjusted continuously on a short time scale that tracks or dynamically accommodates rapid variations in rf signal amplitude (with such variations sometimes referred to as an "envelope"), such as may occur as data is encoded in the rf signal or as the rf signal amplitude is changed with high envelope bandwidth (e.g., as in envelope tracking, envelope tracking advanced, polar modulation, "class G" power amplification, multilevel backoff, multilevel LINC, Asymmetric Multilevel Outphasing, etc.).

The power supply voltage (or voltage levels) provided to the PA may also be adapted to accommodate longer-term changes in a desired rf envelope (e.g., "adaptive bias") such as associated with adapting transmitter output strength to reduce (or ideally, minimize) errors in data transfer, for rf "traffic" variations, etc.

Such continuous supply modulation (e.g., the aforementioned "envelope tracking" or "adaptive bias" techniques) may be advantageously realized by dynamically selecting an intermediate voltage from among a set of discrete power supply voltages and then further regulating (e.g., reducing or "stepping down") this intermediate voltage to create a continuously-variable supply voltage to be provided to a PA. Some rf amplifier systems utilize "discrete" supply modulation (or discrete "drain modulation") in which the supply voltage is switched among a set of discrete voltage levels, possibly including additional filtering or modulation to shape the voltage transitions among levels. Systems of this type may include, for example, "class G" amplifiers, multi-level LINC (MLINC) power amplifiers, asymmetric multi-level outphasing (AMO) power amplifiers, multilevel back-off amplifiers (including "Asymmetric Multilevel Backoff" amplifiers) and digitized polar transmitters among other types. Hybrid systems which utilize a combination of continuous and discrete supply modulation may also be realized.

SUMMARY

Described herein are concepts, systems, circuits, and techniques that provide small and efficient means to generate drive supply voltages(s) of levels above that used for supply modulation. Such voltage levels can enable use of circuitry components that may otherwise not be possible/suitable for the circuit. For example, generated gate drive supply voltages can be used in conjunction with improved switch implementation in at least: (1) supply generators, (2) supply modulators, and (3) ancillary switching systems, thereby enabling improved overall size and efficiency of rf supply modulation systems by enabling the use of smaller and more efficient NMOS transistors.

In an aspect, a circuit is configured to receive a first voltage and a second voltage and generate an output voltage that is greater than both the first voltage and the second voltage. The circuit includes a first capacitor configured to charge to a voltage equal a difference between the first voltage and the output voltage, a second capacitor configured to charge to a voltage equal to a difference between the first voltage and the second voltage, and a plurality of conductive paths coupled to the first capacitor and the second capacitor and having two states. In a first state, the plurality of conductive paths are configured to cause the second capacitor to charge to the voltage equal to the difference between the first voltage and the second voltage. In a second state, the plurality of conductive paths are configured to cause the second capacitor to be connected in parallel with the first capacitor to cause the first capacitor to charge to the voltage equal to the difference between the first voltage and the output voltage.

Implementations can include one or more of the following features.

In some implementations, the output voltage is equal to the first voltage added to a difference between the first voltage and the second voltage.

In some implementations, the output voltage is filtered, regulated, or both to produce a filtered and/or regulated output voltage.

In some implementations, the filtered and/or regulated output voltage is applied to driver circuitry that is configured to power a gate of an NMOS transistor.

In some implementations, the first voltage and the second voltage are each too small to power the gate of the NMOS transistor.

In an aspect, a system includes a circuit that is configured to receive a first voltage and a second voltage and generate an output voltage that is greater than both the first voltage and the second voltage. The circuit includes a first capacitor configured to charge to a voltage equal a difference between the first voltage and the output voltage, a second capacitor configured to charge to a voltage equal to a difference between the first voltage and the second voltage, and a plurality of conductive paths coupled to the first capacitor and the second capacitor and having two states. In a first state, the plurality of conductive paths are configured to cause the second capacitor to charge to the voltage equal to the difference between the first voltage and the second voltage. In a second state, the plurality of conductive paths are configured to cause the second capacitor to be connected in parallel with the first capacitor to cause the first capacitor to charge to the voltage equal to the difference between the first voltage and the output voltage. The system also includes a supply generator configured to provide the first voltage and the second voltage to the circuit, and a supply modulator configured to receive the first voltage and the second voltage and provide a modulator voltage.

Implementations can include one or more of the following features.

In some implementations, the supply modulator includes an NMOS transistor that has a gate that is powered by the output voltage.

In some implementations, the system includes filter circuitry that is configured to receive and filter the modulator voltage to provide a filtered modulator voltage.

In some implementations, the filter circuitry includes an NMOS transistor that has a gate that is powered by the output voltage.

In some implementations, the modulator voltage or the filtered modulator voltage is used to power an amplifier of the system.

In an aspect, a circuit is configured to receive a first voltage and a second voltage and generate an output voltage that is larger than the first voltage and the second voltage. The circuit includes a first capacitor that is configured to charge to a voltage equal to a difference between the first voltage and the output voltage, and a second capacitor configured to charge to a voltage equal to a difference between the first voltage and the second voltage. When the first capacitor and the second capacitor are connected in parallel, the first capacitor charges to the voltage equal to the difference between the first voltage and the output voltage.

Implementations can include one or more of the following features.

In some implementations, once the second capacitor is charged, the second capacitor being connected in parallel with the first capacitor causes the first capacitor to charge to a voltage equal to the difference between the first voltage and the second voltage.

In some implementations, the circuit includes a switch network configured to connect the first capacitor and the second capacitor to the circuit in different configurations.

In some implementations, the output voltage is equal to the first voltage added to the difference between the first voltage and the second voltage.

In some implementations, the output voltage is filtered, regulated, or both to produce a filtered and/or regulated output voltage.

In some implementations, the filtered and/or regulated output voltage is applied to driver circuitry that is configured to power a gate of an NMOS transistor.

In some implementations, the first voltage and the second voltage are each too small to power the gate of the NMOS transistor.

In an aspect, a circuit is configured to receive at least a first voltage and a second voltage and generate an output voltage. The circuit includes a switch network that includes a first pair of switches and a second pair of switches, a first capacitor configured to receive the first voltage and coupled to the switch network, and a second capacitor coupled to the switch network. When the first pair of switches are open and the second pair of switches are closed, the second capacitor is configured to charge to a voltage equal to a difference between the first voltage and the second voltage. When the first pair of switches are closed and the second pair of switches are open, the second capacitor is connected in parallel with the first capacitor to generate the output voltage. The output voltage is greater than both the first voltage and the second voltage.

BRIEF DESCRIPTION OF THE DRAWINGS

The manner and process of making and using the disclosed concepts, systems, devices, circuits and techniques described herein may be appreciated by reference to the figures of the accompanying drawings. It should be appreciated that the concepts, systems, devices, circuits and techniques illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1A:
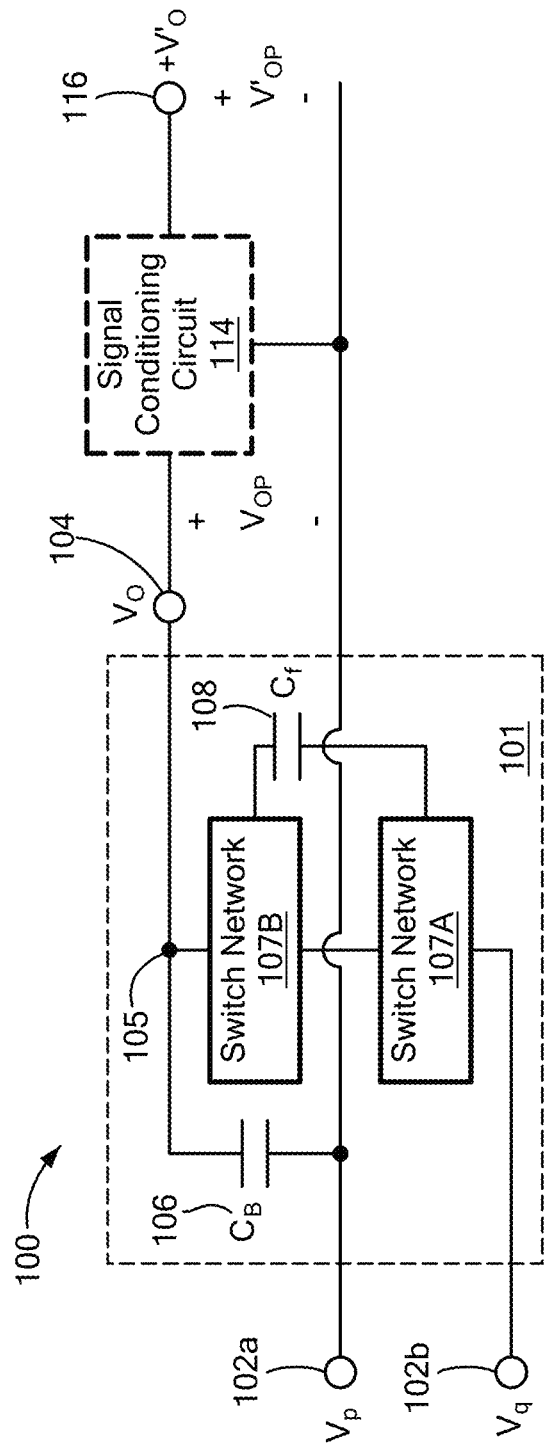
FIG. 1A is a block diagram of a drive supply implemented as a differential switched-capacitor converter.

Radio Frequency (rf) power amplifier systems can include a "supply modulation system" including two subsystems: (a) a "supply generator" that can synthesize multiple power supply voltages from a single input source, and possibly regulate one or more of those power supply voltages, and (b) one or more "supply modulators" that can each rapidly switch among the power supply voltages provided by the supply generator to provide a modulated supply voltage to an rf amplifier. In addition, there can be ancillary networks associated with the supply modulation system including switching elements associated with the connection of a supply modulator output to a load (e.g., a power amplifier). This can include: (1) connection switching networks that enable one or more on-die supply modulator output(s) to be routed to one or more power amplifier output(s); (2) switchable filter components for adjusting filtering of a provided modulator output; and (3) turn-off switch(es) to enable a supply modulator output to be disconnected from a power amplifier and/or filter.

In accordance with the concepts, systems, circuits and techniques, it has been recognized that the manner in which these subsystems are best realized may depend upon the power level, voltage level and application space of the rf amplifier system. It is notable, however, that for many mobile applications, it may be desirable to monolithically integrate electronic elements of both the supply generator and supply modulator as well as portions of the ancillary circuits on a single semiconductor die (e.g., in a CMOS or BCD process), and in some cases it may be desirable to integrate these electronics together with power amplifiers on a single die. In all cases, however, efficient drive of the switches involved in supply generation, supply modulation and ancillary networks is valuable to achieving a small, high-performance design.

As described below, many of the switches used in the circuits of supply modulation systems are realized (i.e., implemented in practical systems) using PMOS transistors. This is often due, at least in part, because supply voltage levels required to drive NMOS transistors are not available (i.e., a circuit in which a switch is used may not carry any voltages which are high enough to drive NMOS transistors). This prevents the use of NMOS transistors in many portions of a circuit.

Because PMOS transistors in typical CMOS processes have much worse (i.e., higher) specific on resistance than NMOS transistors (e.g., by a typical factor of 3-4) and also have much worse (i.e., higher) RC products (i.e., time constants of an RC circuit), PMOS transistors contribute to the transistors and associated circuits being both larger and less efficient than would be possible if NMOS transistors could be used. Thus, in accordance with the concepts described herein, it has been recognized there is a strong motivation to provide compact and efficient means that enable the use of NMOS transistors in circuits.

To address the above-described limitations, the concepts, systems, circuits and techniques described herein are directed towards means to generate supply voltage(s) (e.g., gate drive supply voltages) having voltage levels above that used for supply modulation (as may be used, for example, in a wireless system). The generated gate drive supply voltages can be used in conjunction with improved switch implementation in: (1) supply generators, (2) supply modulators, (3) ancillary switching systems; and (4) any other systems which may benefit from the use of NMOS transistors (e.g. which may benefit from the smaller size and improved efficiency provided by NMOS devices compared with the size and efficiency of systems and circuits which use PMOS devices), thereby enabling improved overall size and efficiency of systems including, but not limited to rf supply modulation systems.

Referring now to FIG. 1A a circuit 100 (sometimes referred to herein as a "drive supply circuit" or more simply a "drive supply") comprises a differential switched-capacitor converter 101 coupled to an optional filtering and/or signal conditioning circuit 114. In general overview, circuit 100 receives a voltage $V_p$ at terminal 102a, a voltage $V_q$ at terminal 102b and provides an output voltage $V_O$ at drive supply circuit terminal 104. The first voltage $V_p$ is greater than the second voltage $V_q$. In some implementations, the voltages $V_p$, $V_q$ may be provided by a supply generator (not illustrated in FIG. 1) and thus are sometimes referred to as supply voltages.

Circuit 100 operates such that the value of output voltage $V_O$ can be greater than both the first voltage $V_p$ and the second voltage $V_q$. Thus, if voltage $V_p$ represents the highest available voltage (e.g., the highest rail voltage) in a system comprising circuit 100, circuit 100 can provide an output voltage which is higher than the highest rail voltage in the system.

In particular, differential switched-capacitor converter 101 operates such that the value of output voltage $V_O$ can be greater than both the first supply voltage $V_p$ and the second supply voltage $V_q$. For example, output voltage $V_O$ can have a value equal to the first supply voltage $V_p$ added to the difference between the first supply voltage $V_p$ and the second supply voltage $V_q$. That is, in embodiments, differential switched-capacitor converter 101 may be operated so as to provide at terminal 104 an output voltage $V_O$ as follows:

$$V_O = V_p + (V_p - V_q).$$

To enable this circuit operation, circuit 100 includes a first capacitor 106 (e.g., a bypass capacitor) having a capacitance $C_B$ and having a first terminal coupled to terminal 102a at which voltage $V_p$ is provided. A second terminal of capacitor 106 is coupled to a node 105. Also coupled to node 105 is a terminal 116 at which output voltage $V'_O$ is provided. In the illustrative embodiment of FIG. 1A, node 105 is coupled to terminal 116 through an optional signal conditioning circuit 114.

Circuit 100 further comprises a second capacitor 108 (e.g., an energy transfer capacitor) having a capacitance $C_f$. Energy transfer capacitor 108 is selectively coupled via one or more switch networks between voltage $V_q$ (at port 102b) and node 105 to which is coupled both the second terminal of capacitor 106 and terminal 104.

In this example, two switch networks 107a,107b are shown for ease of description in explaining the broad concepts sought to be protected. It should, however, be appreciated that in some embodiments, one switch network may be used while in other embodiments, more than two switch networks may be used. It should also be appreciated that switch networks may comprise one or a plurality of switching elements. For example, in embodiments, a single switch network comprising a plurality of switches may be used. Also, the one or more switch networks may comprise one or more of: SPST switches; SPDT switches or single pole, multi-pole switches; and/or multi-pole, multi-throw switches. Combinations of any of the aforementioned types of switches may also be used. Furthermore, it should also be appreciated that in embodiments, capacitors 106, 108 may be implemented as any type of capacitive element suitable for the needs of the application.

In general, the switch networks 107a, 107b are configured to operate in first and second states (e.g., "ON" and "OFF" states) to cause one or more conductive paths therein to alter the connections of capacitors 106, 108.

In a first state, switch networks 107a, 107b are configured such that first and second capacitors 106, 108 are coupled so that second capacitor 108 charges to a voltage equal to the difference between the first supply voltage $V_p$ and the second supply voltage $V_q$. In particular, in the first state, the second capacitor 108 is connected across the first supply voltage $V_p$ and the second supply voltage $V_q$.

In the second state, the first and second capacitor 106, 108 are connected in parallel. This causes the first capacitor 106 to charge to the voltage equal to the difference between the first supply voltage $V_p$ and the second supply voltage $V_q0$. In turn, this causes the output voltage $V_O$ at terminal 104 to be substantially at a voltage level equal to the first voltage $V_p$ plus the difference between the first voltage $V_p$ and the second voltage $V_q$ (i.e., $V_O=V_p+(V_p-V_q)$, or $V_O=2V_p-V_q$). Thus, by properly operating the switch networks 109a, 109b, the output voltage $V_O$ at terminal 104 can be provided having a value larger than any of the voltages provided to terminals 102a, 102b (i.e., higher than voltages $V_p$, $V_q$ in the example of FIG. 1A).

In some embodiments, circuit 100 may include an optional filtering and/or regulation circuitry 114 (generally referred to as signal conditioning circuitry 114). Signal conditioning circuitry 114 allows a filtered and/or regulated output voltage $V_O'$ to be provided at terminal 116. Thus, rather than the output voltage $V_O$ at terminal 104 being directly used as a gate drive voltage (for example), a filtered and/or regulated output voltage $V_O'$ can be provided at terminal 116. Such a filtered and/or regulated voltage can be provided, for example, to driver circuitry (not shown in FIG. 1A) configured to power a gate of an NMOS transistor (not shown in FIG. 1A).

In the example of FIG. 1A, filtering and/or regulation circuitry 114 is shown referenced to voltage $V_p$ appearing at terminal 102a. It should, of course, be appreciated that it may instead be optionally referenced to another potential such as system ground. In some implementations, one may have multiple linear regulators powered from the output voltage $V_O$ at terminal 104 to provide multiple regulated voltages (e.g., $V_O'$, $V_O''$, etc.) that are substantially at or below the output voltage $V_O$. This can be useful in applications which require gate drive supplies at voltages (e.g., multiple voltages) above the first supply voltage $V_p$ 102a (e.g., to drive high-voltage and core NMOS devices whose sources may need to go as high as the first supply voltage $V_p$ 102a, as described in more detail below).

Figure 1B:
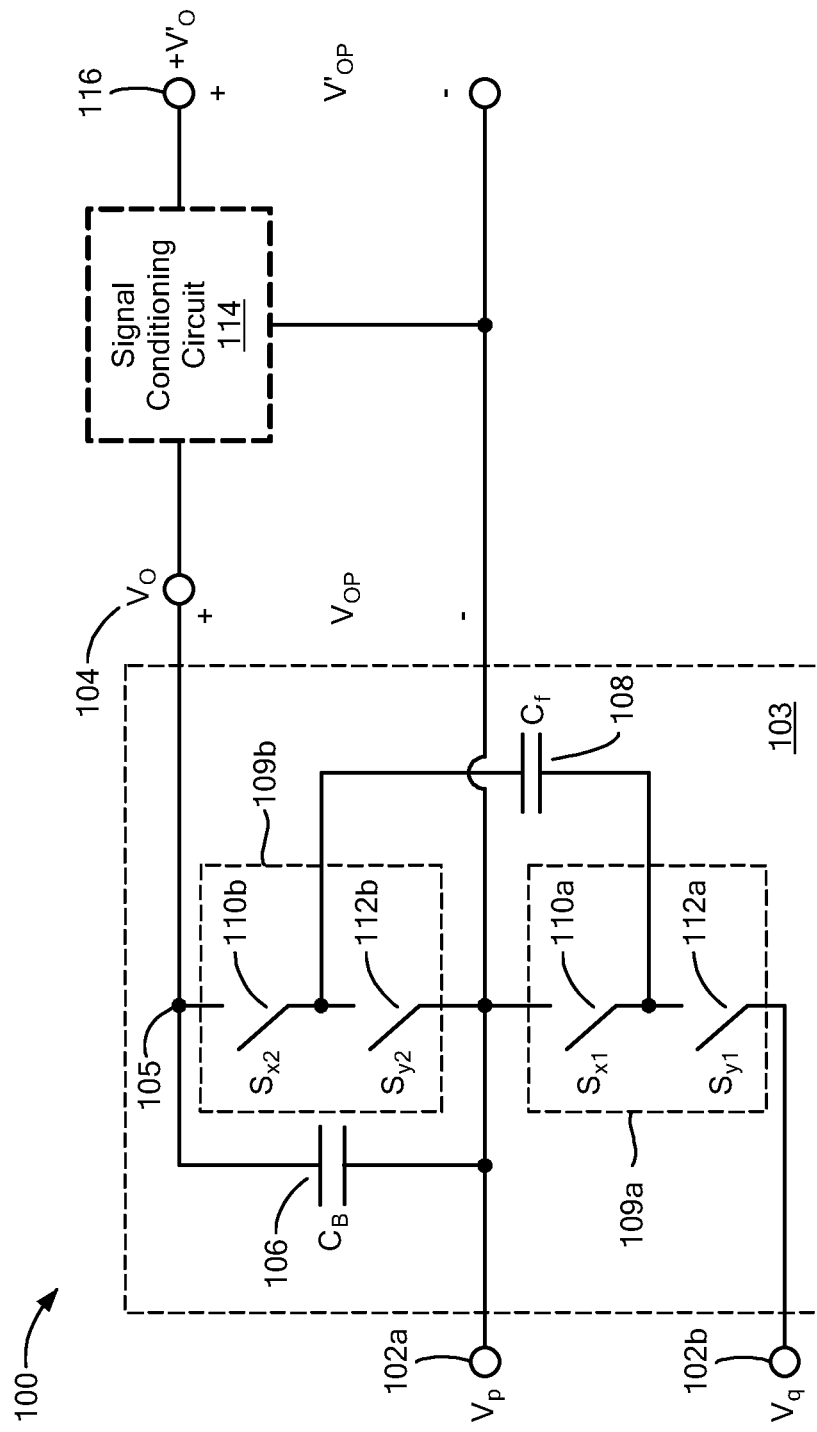
FIG. 1B is a schematic diagram of an example drive supply implemented as a differential switched-capacitor converter.

Referring now to FIG. 1B in which like elements of FIG. 1A are provided having like reference designations, an example implementation (or embodiment) of a circuit 100 (sometimes referred to herein as a "drive supply circuit" or more simply a "drive supply") is provided in accordance with the concepts described herein. In this example embodiment, example drive supply circuit 100 comprises a differential switched-capacitor converter 103 coupled to an optional filtering or signal conditioning circuit 114. Differential switched-capacitor converter 103 may be functionally the same as or similar to differential switched-capacitor converter 101 described above in conjunction with FIG. 1A.

As noted above, differential switched-capacitor converter 101 operates such that the value of output voltage $V_O$ can be greater than both the first supply voltage $V_p$ and the second supply voltage $V_q$. For example, output voltage $V_O$ can have a value equal to the first supply voltage $V_p$ added to the difference between the first supply voltage $V_p$ and the second supply voltage $V_q$. That is, in embodiments, differential switched-capacitor converter 101 may be operated so as to provide at terminal 104 an output voltage $V_O$ as follows:

$$V_O=V_p+(V_p-V_q).$$

To enable this circuit operation, circuit 100 includes a first capacitor 106 (e.g., a bypass capacitor) having a capacitance $C_B$ and having a first terminal coupled to terminal 102a at which voltage $V_p$ is provided. A second terminal of capacitor 106 is coupled to a node 105. Also coupled to node 105 is a terminal 116 at which output voltage $V'_O$ is provided. In the illustrative embodiment of FIG. 1B, node 105 is coupled to terminal 116 through an optional signal conditioning circuit 114.

Circuit 100 further comprises a second capacitor 108 (e.g., an energy transfer capacitor) having a capacitance $C_f$. Energy transfer capacitor 108 is selectively coupled via one or more switch networks between voltage $V_q$ (at port 102b) and to node 105 to which is coupled both the second terminal of capacitor 106 and terminal 104.

In the example embodiment of FIG. 1B, shown are two switch networks 109a, 109b which may be the same as or similar to switch networks 107a, 107b in FIG. 1A. Switch networks 109a, 109b and capacitors 106, 108 are coupled so as to provide at least two different configurations in which the capacitors may be coupled.

Switch networks 109a, 109b may be implemented in a variety of ways. FIG. 1B illustrates one example implementation for switch networks 109a, 109b in which each switch network comprises a pair of serially coupled switches (e.g., switches 110a, 112a in switch network 109a and switches 110b, 112b in switch network 109b).

In general, the switch networks 109a, 109b are configured to switch between a first state and a second, different state (e.g., "ON" and "OFF" states) to cause one or more switches and/or one or more conductive paths therein to alter the connections of the first capacitor 106 and the second capacitor 108.

In a first state, the first and second capacitors 106, 108 are coupled such that the second capacitor 108 charges to a voltage equal to the difference between the first supply voltage $V_p$ and the second supply voltage $V_q$. In particular, in the first state, the second capacitor 108 is connected across the first supply voltage $V_p$ and the second supply voltage $V_q$.

In the second state, the second capacitor 108 is connected in parallel with the first capacitor 106. This causes the first capacitor to charge to the voltage equal to the difference between the first supply voltage $V_p$ and the second supply voltage $V_q$. In turn, this causes the output voltage $V_O$ at terminal 104 to be substantially at a voltage level equal to the first supply voltage $V_p$ plus the difference between the first supply voltage $V_p$ and the second supply voltage $V_q$ (i.e., $V_O=V_p+(V_p-V_q)$, or $V_O=2V_p-V_q$). Thus, by properly operating the switch networks 109a, 109b, the output voltage $V_O$ at terminal 104 can be provided having a value larger than any of the voltages provided to terminals 102a, 102b (i.e., higher than voltages $V_p$, $V_q$ in the example of FIG. 1B). Voltages $V_p$, $V_q$ may, for example, be supply voltages (e.g., provided by a supply generator).

Thus, if voltage $V_p$ corresponded to the highest rail voltage available in a system, and if such a voltage were not at a level capable of biasing an NMOS device, with the circuit and technique describe in conjunction with FIGS. 1A and 1B, it is now possible to utilize devices (e.g. NMOS devices) that would otherwise not be usable in the circuit 100 if not for the increased output voltage $V_O$ (i.e., increased above the voltage level $V_p$). For example, NMOS transistors that require gate drive voltages that are higher than the first and second supply voltage $V_p$, $V_q$ can nonetheless be used due to the generation of the larger output voltage $V_O$ at terminal 104.

Figure 2:
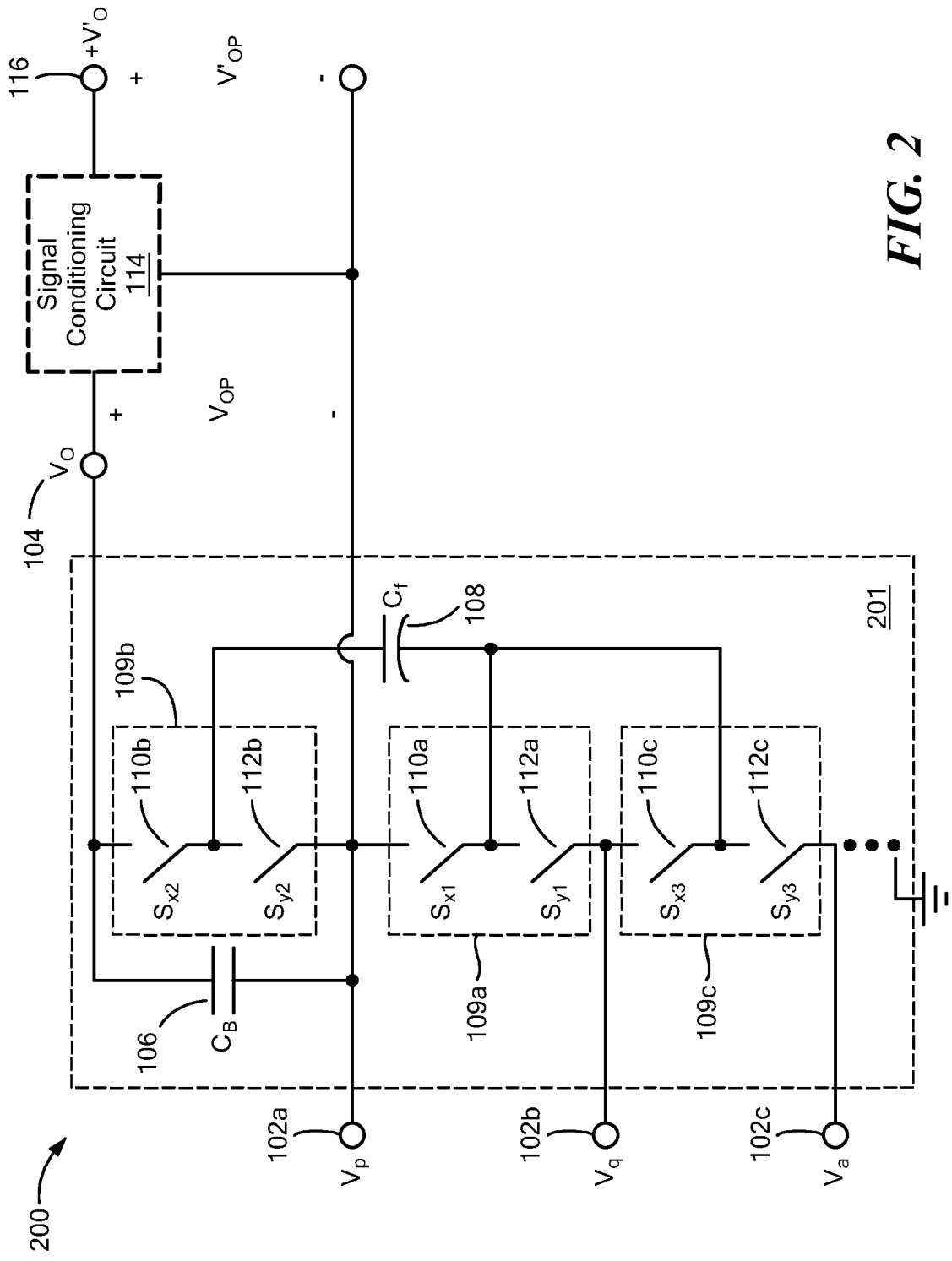
FIG. 2 is a schematic diagram of an example drive supply implemented as a multiple-input differential switched-capacitor converter.

In the example embodiment of FIG. 1B and referring also to FIG. 2 in which like elements of FIG. 1B are provided having like reference designations, the differential switched-capacitor converter 103 can be realized with switch networks that includes at least a first pair of switches $S_{x1}$ 110a, $S_{x2}$ 110b and a second pair of switches $S_{y1}$ 112a, $S_{y2}$ 112b that are connected to the first capacitor $C_B$ 106 and the second capacitor $C_f$ 108. The first pair of switches $S_{x1}$ 110a, $S_{x2}$ 110b may be switched on and off together and the second pair of switches $S_{y1}$ 112a, $S_{y2}$ 112b may be switched on and off together, with switches $S_x$ 110 switched complementary to switches Sy 112 (e.g., with 50% duty ratio) at a particular switching frequency $f_{sw}$.

With respect to the first state and the second state of the switch circuits 109a, 109b, the first pair of switches $S_{x1}$ 110a, $S_{x2}$ 110b being open and the second pair of switches $S_{y1}$ 112a, $S_{y2}$ 112b being closed can correspond to the first state, and the first pair of switches $S_{x1}$ 110a, $S_{x2}$ 110b being closed and the second pair of switches $S_{y1}$ 112a, $S_{y2}$ 112b being open can correspond to the second state. If the first supply voltage $V_p$ 102a is the highest supply generator output voltage and the second supply voltage $V_q$ 102b is a lower voltage, the drive supply output voltage $V_O$ is an amount $(V_p-V_q)$ above that of $V_p$, such that if an appropriate second supply voltage $V_q$ is selected, voltage $V_O$ it may be used to provide gate drive supply voltages for NMOS devices whose source voltage goes up to the first supply voltage $V_p$ 102a.

Also shown in FIG. 1B is optional signal conditioning circuitry 114 discussed above in conjunction with FIG. 1A.

As in the example of FIG. 1A, signal conditioning circuitry 114 is shown referenced to the first supply voltage $V_p$ 102a. It should, of course, be appreciated that it may instead be optionally referenced to another potential such as system ground. In some implementations, one may have multiple linear regulators powered from the output voltage $V_O$ at terminal 104 to provide multiple regulated voltages (e.g., $V_O'$, $V_O''$, etc.) that are at or below voltage the output voltage $V_O$. This can be useful if one needs gate drive supplies at voltages (e.g., multiple voltages) above the first supply voltage $V_p$ 102a (e.g., to drive high-voltage and core NMOS devices whose sources may need to go as high as the first supply voltage $V_p$ 102a, as described in more detail below).

In some implementations, switches $S_{x2}$ 110b/$S_{y2}$ 112b and $S_{x1}$ 110a/$S_{y1}$ 112a may be implemented as CMOS pairs (e.g., $S_{x1}$ 110a and $S_{x2}$ 110b realized with PMOS devices and $S_{y1}$ 112a and $S_{y2}$ 112b implemented with NMOS devices), either using core devices of a CMOS process or higher voltage devices of a CMOS or BCD process. In some implementations, it may instead be preferable to implement one or both of the second pair of switches $S_{y1}$ 112a, $S_{y2}$ 112b also as PMOS devices in order to simplify their gate drive control. In some implementations, it may be preferable to implement $S_{x1}$ 110a and $S_{y1}$ 112a as active switches and $S_{x2}$ 110b and $S_{y2}$ 112b as MOS, Schottky or other diodes in order to further simplify gate drive requirements.

Capacitor 106 may be provided having a capacitance $C_B$ selected to be large enough to maintain voltage provided to the desired output voltage $V_O$ having a ripple which permits operation of the circuit in the desired application and to provide sufficient bypass to enable the amount of peak output current required for use in supplying gate drive power as described above. Second capacitor 108 may be provided having a capacitance $C_f$ selected to be sufficiently large to provide a charge transfer which limits (and ideally, eliminates) droop in the output voltage $V_O$ at the particular switching frequency $f_{sw}$.

The output resistance at terminal 104 (i.e., where output voltage $V_O$ appears) contributed by the differential SC converter is $R_{out}=1/(C_f f_{sw})$ in the slow-switching limit of the differential switched-capacitor drive supply, such that the output voltage $V_O$ will ideally droop by an amount ILRout from its open circuit voltage of the difference between the first supply voltage $V_p$ 102a and the second supply voltage $V_q$ 102b (e.g., $V_p-V_q$) at an average load current on the supply IL.

In the fast switching limit, the output resistance will be $2(R_x+R_y)$ if $R_x$ is the on-state resistances of switches $S_x$ 110 and $R_y$ is the on-state resistance of switches $S_y$ 112. For low-output-power systems, the second capacitor $C_f$ 108 may optionally be realized using a capacitor realized on a semiconductor die (e.g., based on one or more of a MOS capacitor, MIM capacitor, trench capacitor or other capacitive element). For higher power level systems, the second capacitor $C_f$ 108 can be realized as an off-die capacitor. Thus, in some embodiments, it may be desirable that circuit 100 be on a single die (i.e., capacitors 106, 108 are provided as on-die capacitors. This approach avoids external interconnects which may introduce resistance and parasitic capacitance and/or inductance and/or resistance. However, in some embodiments, it may be desirable that one or both of capacitors 106, 108 be provided as external capacitors. After reading the disclosure provided herein, one of ordinary skill in the art will appreciate how whether to utilize on-die or external capacitors to meet the needs of a particular application.

For system implementations using a multi-output supply generator that incorporates a switched-capacitor energy transfer stage, it may be desirable to switch the differential switched-capacitor drive supply circuit 100 of FIGS. 1A and 1B synchronously with that of the supply generator in order to yield time aligned switching noise generation and/or simplify drive control circuitry. In other applications, the differential switched-capacitor drive supply circuit may be switched independently (e.g., with different frequency and phase) than that of the supply generator. In such cases, it may be desirable to adapt the particular switching frequency $f_{sw}$ of the differential switched-capacitor drive supply circuit based on its load or output voltage. This may be done to improve efficiency vs. loading current on the circuit 100 and/or to provide regulation (control) of the output voltage $V_O$ with respect to a desired reference voltage $V_O$, ref through use of the variability of the output resistance of the drive supply circuit 100 with switching frequency as described above. Moreover, the switching of the drive supply switches can also be turned off and on over time (e.g., burst mode operation) in order to allow very low power operation to be achieved efficiently.

In many applications, supply generator voltages may be adapted based on the operating condition of a system (e.g., ratiometrically-related voltages $V_1, \ldots, V_n$ may vary with specified operating points of the system over time.) Consequently, if $V_p$ and $V_q$ are drawn from supply generator voltages (e.g., $V_p=V_n$ and $V_q=V_{n-1}$), $V_O-V_p$ will vary with $V_p-V_q$. For a switched-capacitor drive supply, it may be desirable to generate an output voltage $V_O$ (or a differential voltage $V_O-V_p$) that has smaller variation over time than the difference between $V_p$ and $V_q$. To accomplish this, one may leverage additional supply voltage inputs as illustrated in FIG. 2.

In keeping with the disclosed concepts, systems, circuits and techniques, FIG. 2 illustrates a circuit 200 of an example drive supply implemented with a multiple-input differential switched-capacitor converter 201. The first supply voltage $V_p$ 102a, the second supply voltage $V_q$ 102b, and a third supply voltage $V_r$ 102c are three input potentials with $V_p>V_q>V_r$, which may optionally be derived from three supply generator voltage inputs.

In the example embodiment of FIG. 2, shown are three switch networks 109a, 109b, 109c. Switch networks 109a, 109b, 109c may be implemented in a variety of ways. FIG. 2 illustrates one example implementation for switch networks 109a, 109b, 109c in which each switch network comprises a pair of serially coupled switches (e.g., switches $S_{x1}$ 110a and $S_{y1}$ 112a in switch network 109a, switches $S_{x2}$ 110b and $S_{y2}$ 112b in switch network 109b, and switches $S_{x3}$ 110c and $S_{y3}$ 112c in switch network 109c. In a first operating mode, the switches $S_{x3}$ 110c and $S_{y3}$ 112c may be held off, $S_{x1}$ 110a and $S_{x2}$ 110b may be switched on and off together, and $S_{y1}$ 112a and $S_{y2}$ 112b may be switched on and off together, with operating switches $S_x$ 110 switched complementary to operating switches $S_y$ 112 (e.g., with 50% duty ratio) at the particular switching frequency $f_{sw}$. In this mode, the circuit provides a generated drive voltage $V_{Op}=V_p-V_q$ (or ground-referenced output voltage $V_O$, which is equal to $2V_p-V_q$). In a second operating mode, switches $S_{x2}$ 110b and $S_{y2}$ 112b may be held off. $S_{x3}$ 110c and $S_{x2}$ 110b may be switched on and off together and $S_{y3}$ 112c and $S_{y2}$ 112b may be switched on and off together, with operating switches $S_x$ 110 switched complementary to operating switches $S_y$ 112 (e.g., with 50% duty ratio) at the particular switching frequency $f_{sw}$. In this mode, the circuit 200 provides a generated drive voltage $V_{Op}=V_p-V_r$ (or ground-referenced output voltage $V_O$, which is equal to $2V_p-V_r$). We may select between operating modes, for example, based on available values of the supply voltages $V_p$ 102a, $V_q$ 102b, $V_r$ 102c, such that the output voltage $V_O$ remain as close to a target voltage as possible or such that it is as small as possible above a minimum target voltage. With this more sophisticated implementation, the variation of $v_{op}$ can be reduced as $V_p$, $V_q$, $V_r$ vary under different operating conditions. It will be appreciated that while the implementation of FIG. 2 uses three inputs and has two operating modes, implementations having more than three inputs and more than two associated operating modes can likewise be realized.

As an example of the benefit of such circuits 100, 200, consider a system with a supply generator which generates a set of ratiometric supply voltages $V_1, \ldots, V_n$ where $V_n=nV_1$, with $V_1$ being regulated over an example range between 0.5-0.9 V depending upon desired operating condition. Further suppose that the system is constructed with a CMOS process with low-voltage "core" PMOS and NMOS transistors having a 2V voltage rating and a minimum desired drive voltage of 1 V, and "extended voltage" PMOS and NMOS transistors having a 5 V voltage rating and a minimum desired drive voltage of 1.5 V.

Figure 3:
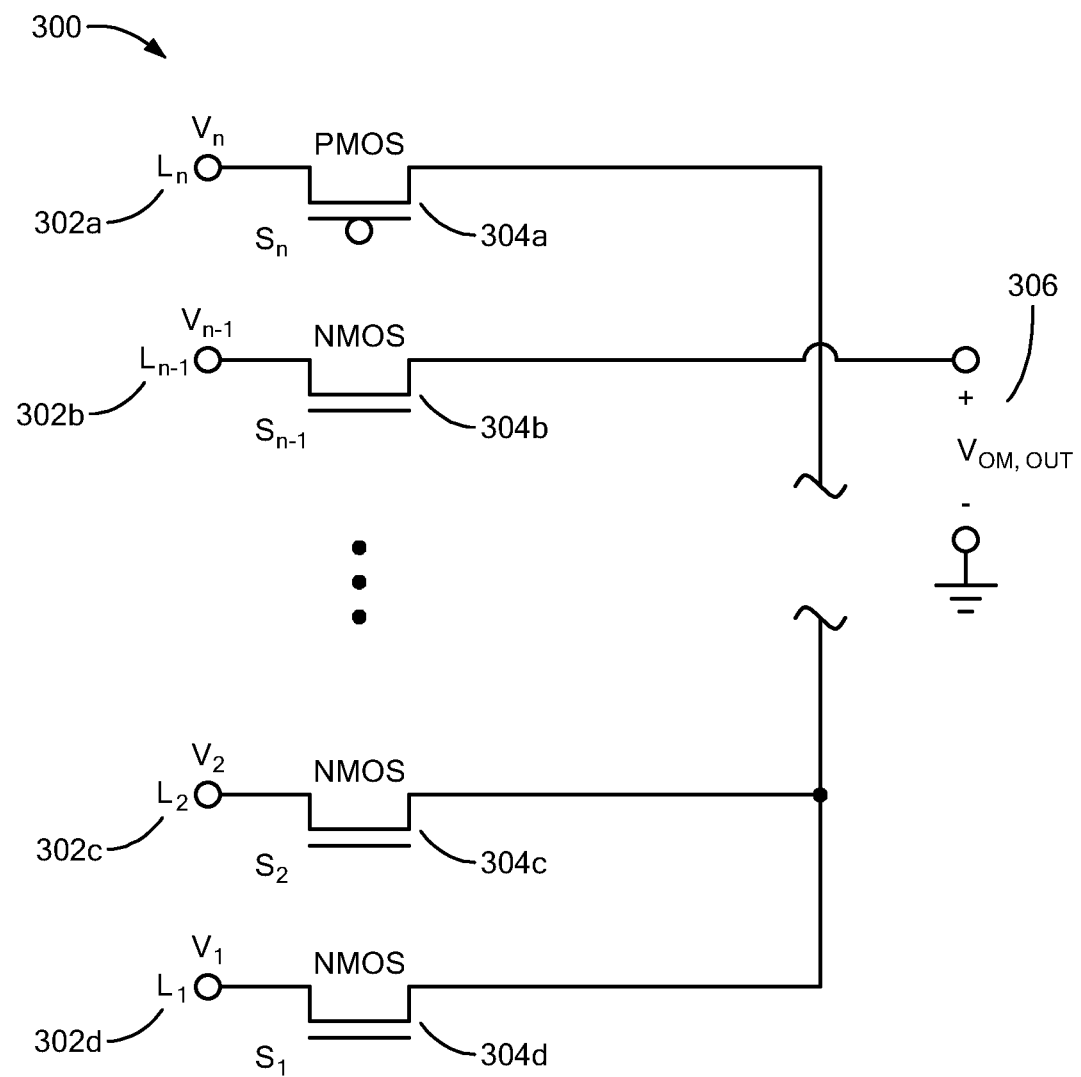
FIG. 3 is a schematic diagram of an example multi-level supply modulator for a system in which $V_n$ the highest available voltage for drive purposes. Sn is implemented with a PMOS device.

FIG. 3 shows an exemplary multi-level supply modulator 300 that could be used with a system in which the voltage $V_n$ is the highest-available voltage with which to drive transistors. Body switching can be employed with one or more of switches 304 to enable bidirectional blocking of these devices under different required conditions. Alternatively, these devices could be replaced with transistors coupled in a back-to-back configuration (so-called "back-to-back transistors") to provide bidirectional blocking capability. It will be appreciated that the 5V transistors could be used for one or more of the switches 304, or one or more of the switches could also implemented as cascoded (stacked, or series-connected) switch structures utilizing 2V devices.

In particular, in the modulator of FIG. 3, the first switch $S_n$ 304a is implemented with a PMOS device (e.g., a 5V or 2V PMOS device) because having at most $V_n$ available for gate drive would not be adequate to utilize an NMOS device. The second, third, and fourth switches $S_{n-1}$, $S_2$, $S_1$ 304b-d are implemented with NMOS devices (e.g., 5V or 2V NMOS devices) because the available voltage inputs are sufficient to power the gates of these NMOS devices. While this modulator can achieve high performance, its required size and achievable performance are limited by the requirement to use a PMOS device for the first switch $S_n$ 304a. In some implementations, the PMOS device used for the first switch $S_n$ 304a can be particularly large and lossy.

Figure 4:
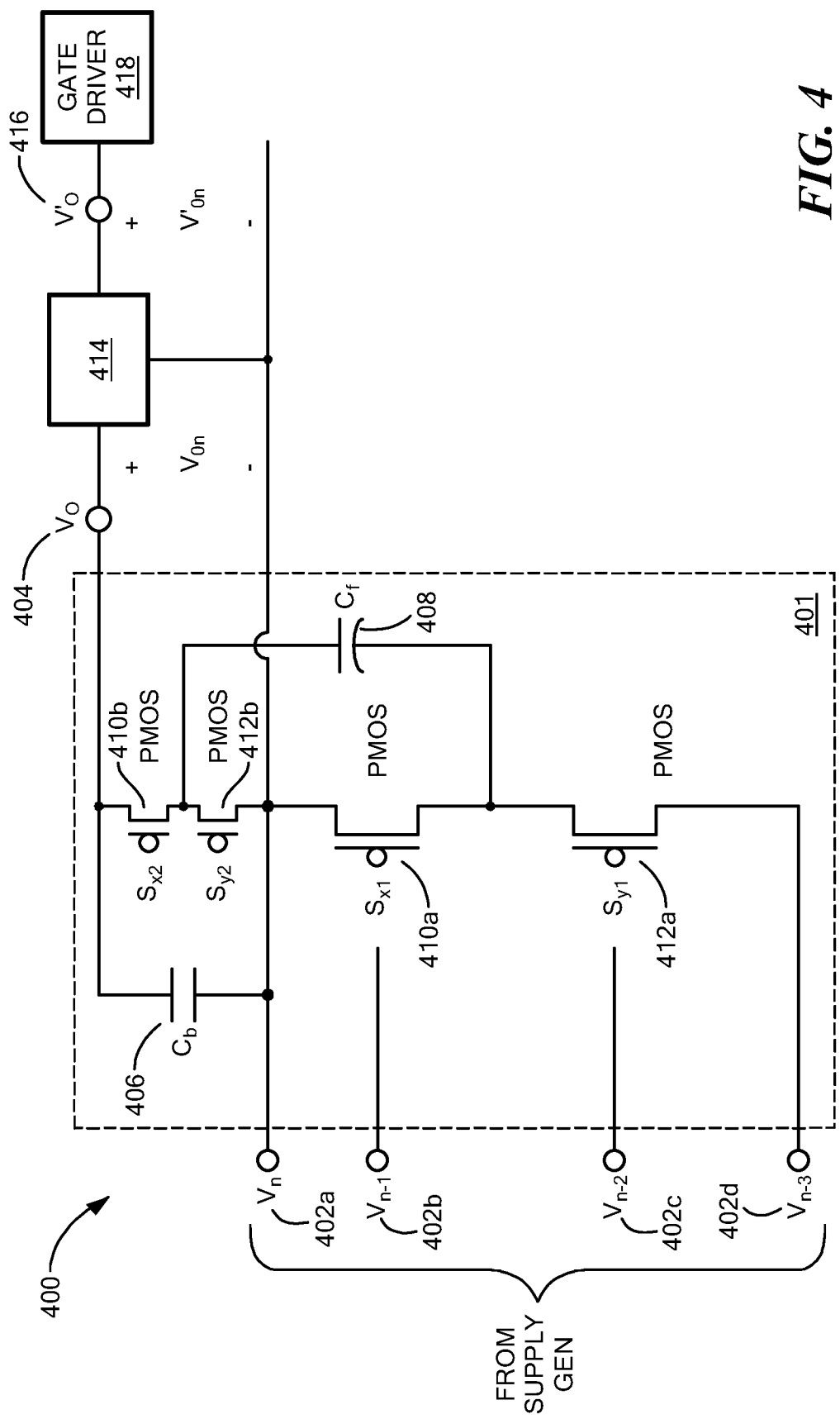
FIG. 4 is a schematic diagram of an example drive supply implemented as a differential switched-capacitor converter.

FIG. 4 shows an example of a drive supply circuit 400 implemented as a differential switched-capacitor converter 401 that is generally based on the concepts shown in at least FIGS. 1A, 1B, and 2. The circuit 400 can generate an available output voltage $V_O$ 404 that is an amount $V_n-V_{n-3}$ above $V_n$. This would provide adequate drive supply to enable a NMOS device to be used for the switch $S_n$ (e.g., of FIG. 3) in a modulator. Likewise, the output voltage $V_O$ 404 could be regulated down (as illustrated with the optional filtering and/or signal conditioning circuitry 414) to a filtered and/or regulated output voltage $V'_O$ 416 (e.g., providing a voltage $V'_{On}$) that is sufficiently above $V_n$ to enable NMOS devices to be used for switches that may or may not be shown in the circuit 400. The filtered and/or regulated output voltage $V'_O$ 416 can be provided to driver circuitry, such as a gate driver 418 that powers a gate of an NMOS device.

Figure 5:
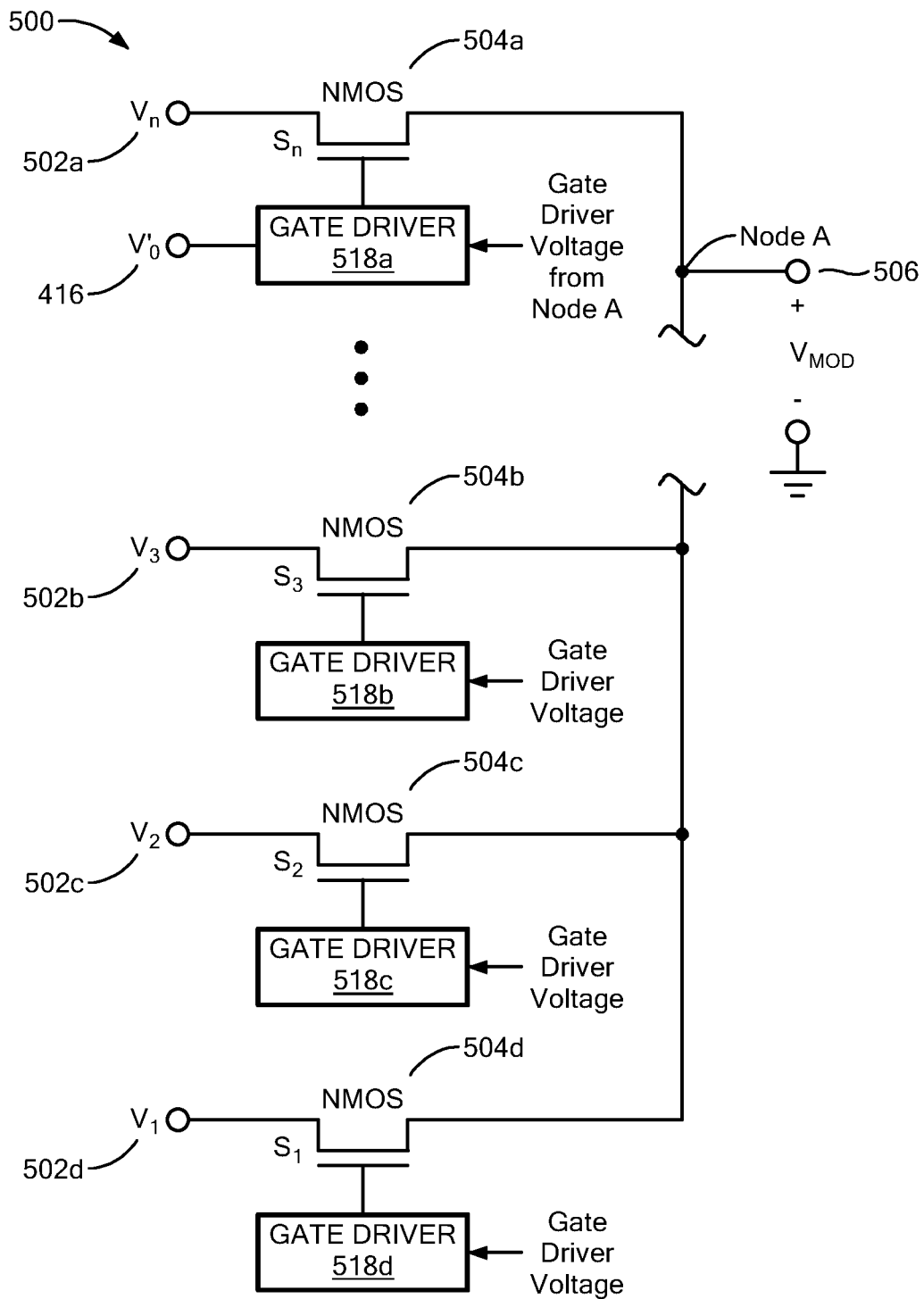
FIG. 5 is a schematic diagram of an example multi-level supply modulator for a system in which, for example, the drive supply of FIG. 4 is available. Consequently, $S_n$ can be implemented with an NMOS device.

FIG. 5 shows an example multi-level supply modulator 500 for a system in which, for example, the drive supply circuit 400 of FIG. 4 is available. Thus, in contrast to the modulator 300 of FIG. 3, a voltage higher than $V_n$ is available. In particular, a voltage equal to $V_n+V_n-V_{n-3}$ (e.g., the filtered and/or regulated output voltage $V'_O$ 416) can be provided to driver circuitry such as a gate driver 518a which is used to power a gate of a first switch 504a in the form of an NMOS device (e.g., a 5V or 2V NMOS device). The switches $S_n$, $S_3$, $S_2$, $S_1$ 504a-d can be switched to provide a particular modulator voltage $V_{MOD}$ 506 based on available supply voltages 502a-d. As described below, the modulator voltage $V_{MOD}$ 506 can be filtered and/or regulated with optional filter and/or regulation circuitry before being provided to a power amplifier. Additional gate drivers 518b-d can be used to power the gates of other switches 504b-d of the modulator 500.

The concepts, systems, circuits, and techniques described herein can be implemented in various ways in a radio frequency (rf) amplifier system. Examples of such implementations will be described, but it should be appreciated that these implementations are being provided for exemplary purposes, and other implementations are within the scope of the claims.

Figure 6:
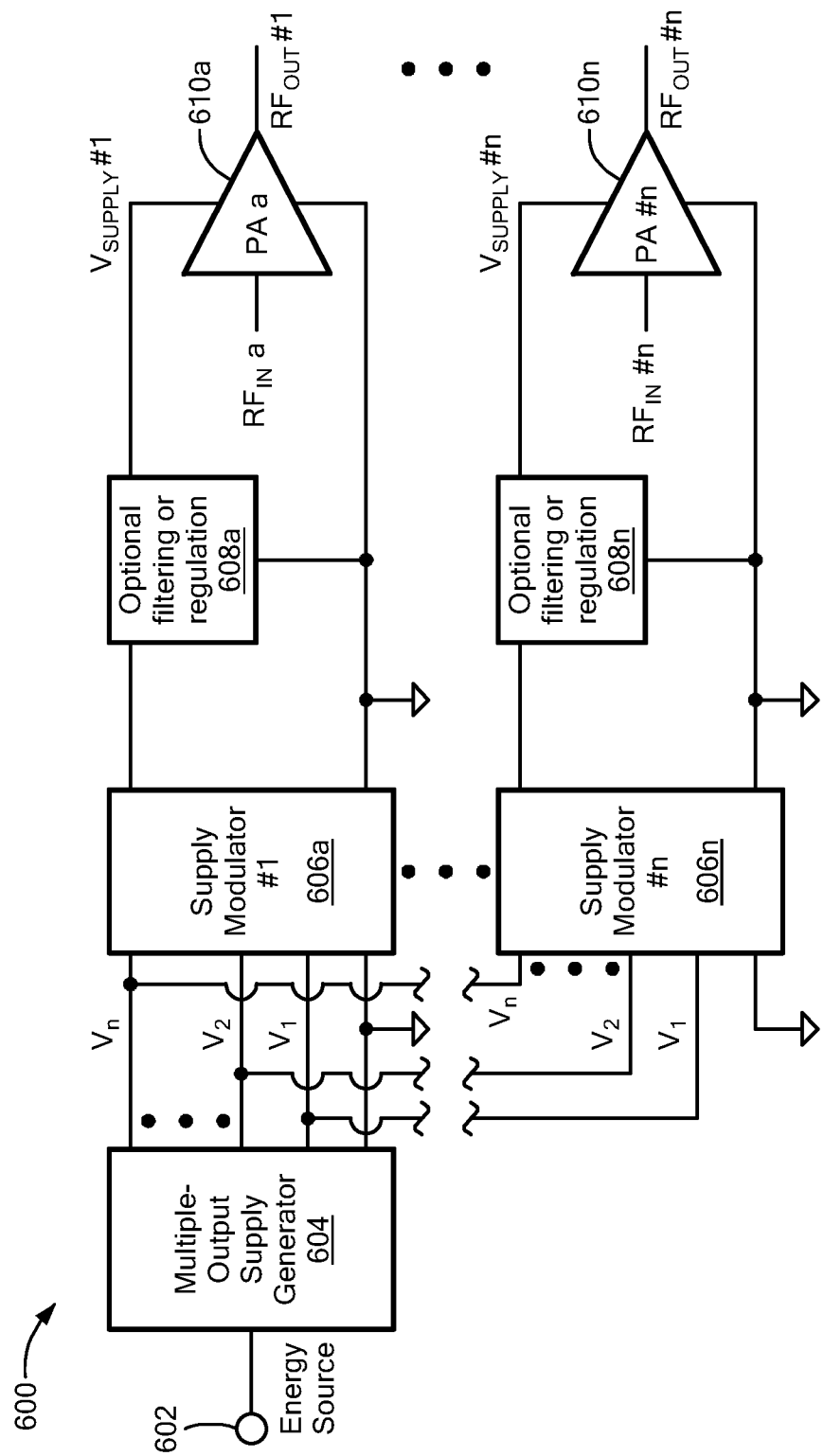
FIG. 6 is block diagram of an example radio frequency (rf) power amplifier system utilizing multiple supply levels and illustrates a system architecture including supplying multiple power amplifiers.

FIG. 6 shows a block diagram of an exemplary system architecture for an rf amplifier system 600 utilizing multiple supply levels $V_1-V_n$. The system 600 includes an energy source 602 that provides power to a multiple-output supply generator 604 that is configured to provide the supply levels (e.g., supply voltages). The system 600 includes a plurality of supply modulators 606a-n, an optional plurality of filtering and/or regulation circuitry 608a-n that are configured to receive and filter and/or regulate the modulator voltage (e.g., $V_{MOD}$ 506 of FIG. 5) to provide a filtered and/or regulated modulator voltage, and a plurality of power amplifiers 610a-n that are configured to receive a voltage supply based on the operation of the supply modulators 606a-n. One or more aspects of signal processing and control for the system 600 are omitted from FIG. 6.

Figure 7:
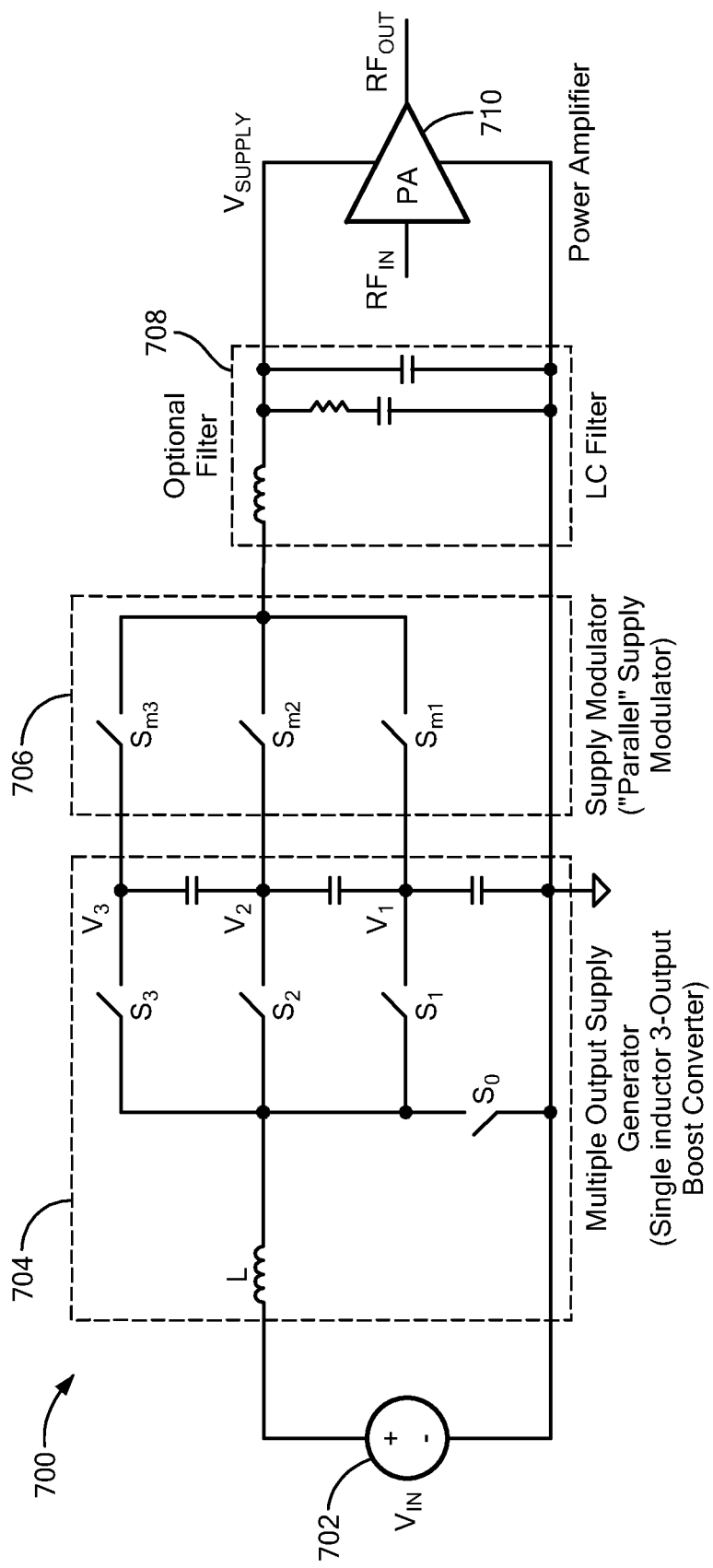
FIG. 7 is block diagram of an example implementation of an rf power amplifier system including a single-inductor multiple-output boost converter as a supply generator, a "parallel" supply modulator, and an optional LC filter.

FIG. 7 shows a block diagram of an exemplary system architecture for an rf amplifier system 700 including a single-inductor multiple-output boost converter as a supply generator 704, a parallel supply modulator 706, and an optional LC filter 708. The supply modulator 706 provides one of the supply voltages $V_{1-3}$ to a power amplifier 710 based on operation of the supply modulator 706.

The systems 600, 700 of FIGS. 6 and 7 include a "supply modulation system" including two subsystems: (a) a "supply generator" that can synthesize multiple power supply voltages from a single input source, and possibly regulate one or more of those power supply voltages, and (b) one or more "supply modulators" that can each rapidly switch among the power supply voltages provided by the supply generator to provide a modulated supply voltage to an rf amplifier. In addition, there can be ancillary networks associated with the supply modulation system including switching elements associated with the connection of a supply modulator output to a load (e.g., a power amplifier). This includes: (1) connection switching networks that enable a one or more on-die supply modulator output(s) to be routed to one or more power amplifier output(s); (2) switchable filter components for adjusting filtering of a provided modulator output; (3) turn-off switch(es) to enable a supply modulator output to be disconnected from a power amplifier and/or filter.

In accordance with the concepts, systems, circuits and techniques, it has been recognized that the manner in which these subsystems are best realized may depend upon the power level, voltage level and application space of the rf amplifier system. It is notable, however, that for many mobile applications, it may be desirable to monolithically integrate electronic elements of both the supply generator and supply modulator as well as portions of the ancillary circuits on a single semiconductor die (e.g., in a CMOS or BCD process), and in some cases it may be desirable to integrate electronics these electronics together with power amplifiers on a single die. In all cases, however, efficient drive of the switches involved in supply generation, supply modulation and ancillary networks is valuable to achieving a small, high-performance design.

Supply generators can be realized through a variety of methods. Supply generators have been realized using multiple separate converters, multiple-output magnetic converters, multiple-output switched-capacitor converters and hybrid magnetic/switched-capacitor converters providing a ratiometric set of output voltages, and hybrid magnetic/switched-capacitor converters providing differential capacitive energy transfer for related but non-ratiometric distribution of discrete supply voltages.

Figure 8:
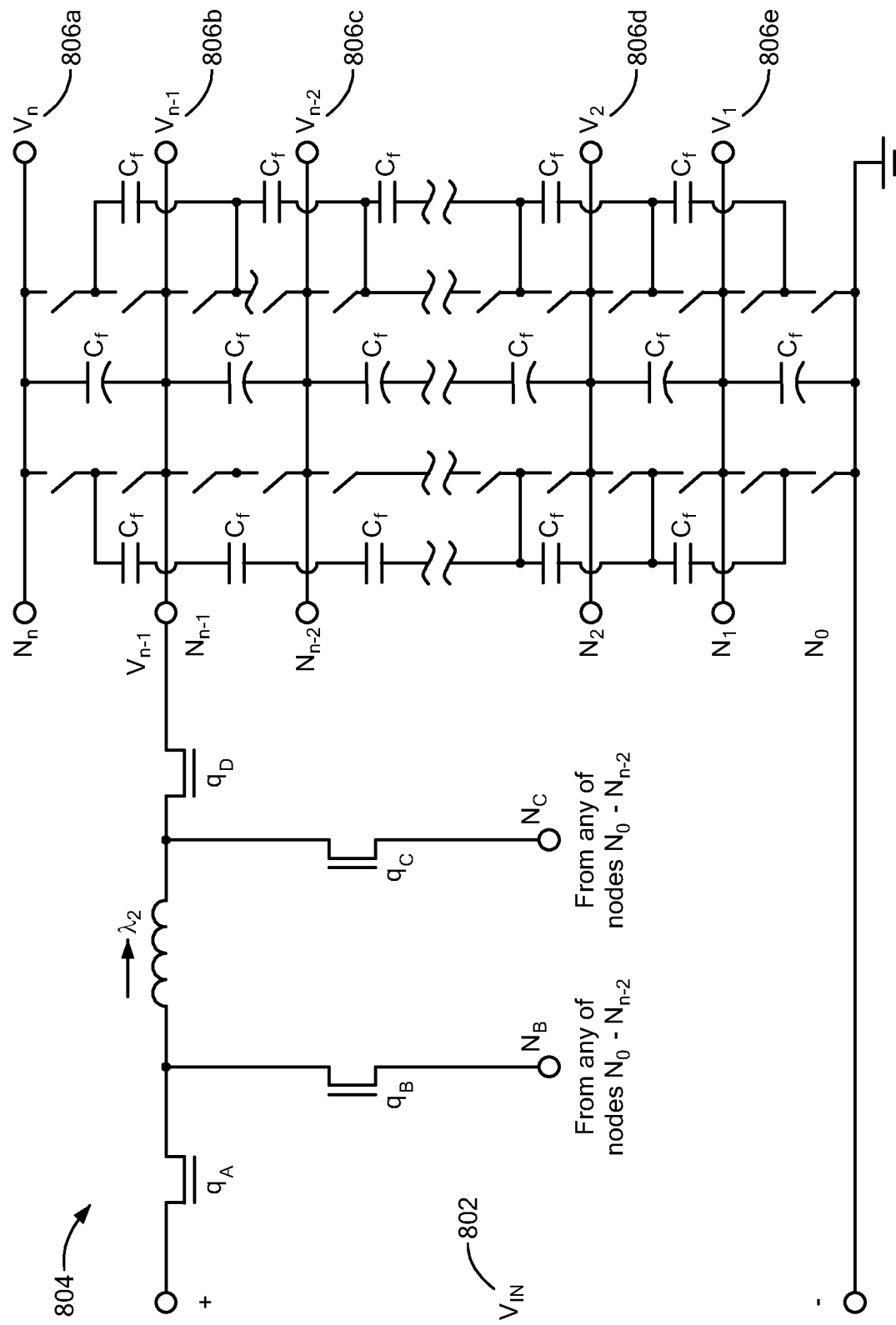
FIG. 8 is a schematic diagram of an example hybrid magnetic/switched-capacitor multiple-output supply generator.

One hybrid SC/magnetic design providing ratiometric output voltages is illustrated in FIG. 8. FIG. 8 is a schematic diagram of an example hybrid magnetic/switched-capacitor multiple-output supply generator 804. The generator 804 can provide buck-boost capability with low device and inductor stress. Because of available gate drive voltage limitations, the magnetic stage devices qA and qD would typically be implemented with PMOS transistors instead of NMOS transistors. Likewise, some or all of the top sets of switches in the switched-capacitor stage (e.g., the switches connected in half bridges between $V_n$ and $V_{n-1}$) would be implemented with PMOS transistors for the same reason. This requirement, which results from a lack of available supply voltages to drive NMOS switches in those positions, incurs a significant penalty in achievable die area (size) and efficiency of the supply generator. However, by utilizing the techniques described above of obtaining voltage levels above the highest available voltage provided by the supply generator, one or more of the switches shown in FIG. 8 may be replaced with NMOS devices.

Figures 9A, 9B:
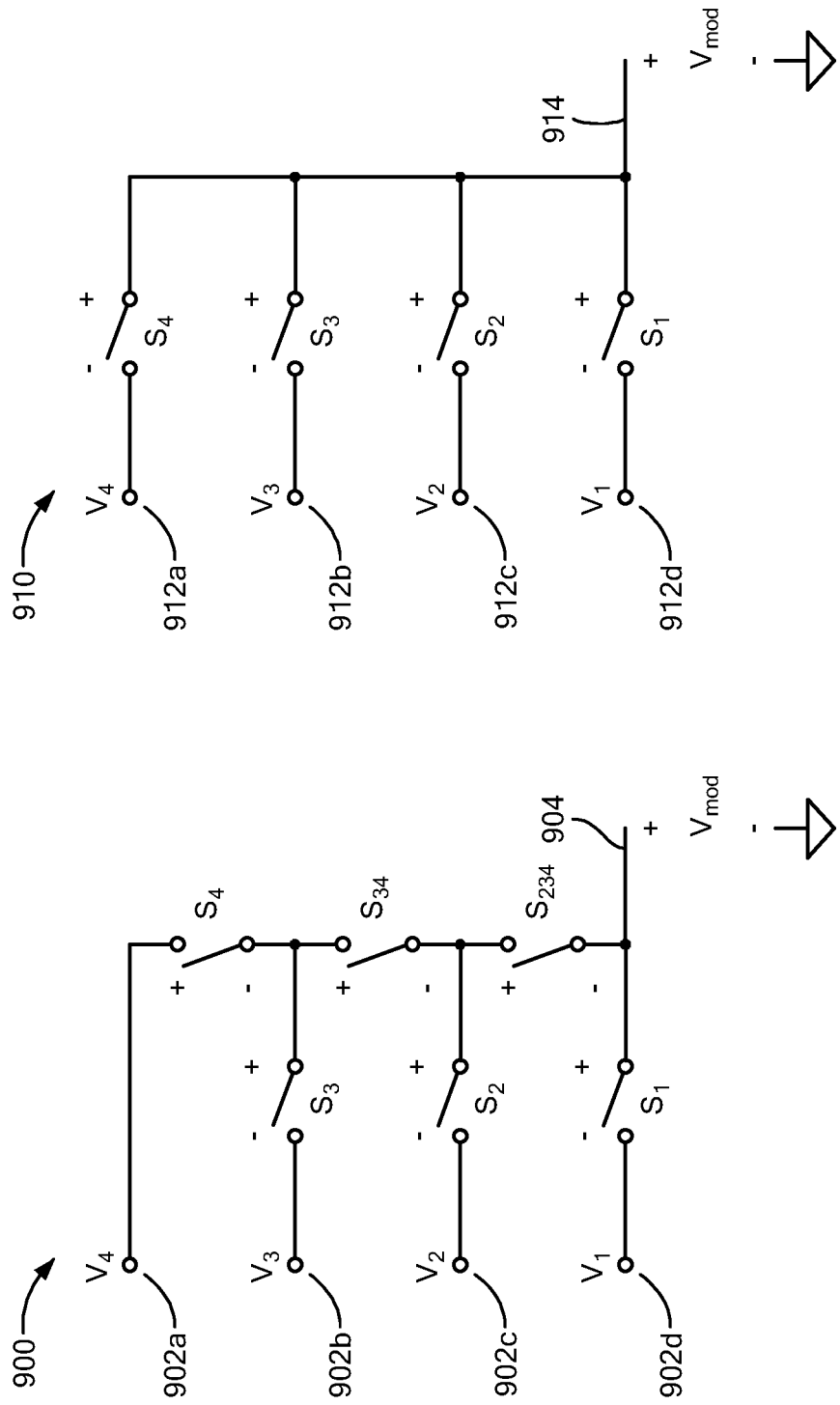
FIG. 9A is a schematic diagram which illustrates a structure of an exemplary switching network corresponding to a 4-level "series" supply modulator.
FIG. 9B is a schematic diagram which illustrates a structure of an exemplary switching network corresponding to a 4-level "parallel" supply modulator.

A variety of different switching circuits may be utilized to realize the supply modulator subsystem (e.g., 606 of FIG. 6). Two exemplary networks are illustrated in FIGS. 9A and 9B: an exemplary 4-level "series" supply modulator 900 is shown in FIG. 9A, and an exemplary 4-level "parallel" supply modulator 910 is shown in FIG. 9B. The series supply modulator 900 is configured to receive a plurality of supply voltages 902*a-d* and includes a plurality of switches that are configured to change states to provide a particular voltage as the modulator voltage $V_{MOD}$ 904. Likewise, the parallel supply modulator 910 is configured to receive a plurality of supply voltages 912*a-d* and includes a plurality of switches that are configured to change states to provide a particular voltage as the modulator voltage $V_{MOD}$ 914. A wide variety of other switching network topologies can also be used. Note that while the modulator designs shown are for switching among four (4) supply generator levels, designs for switching among different numbers of levels are possible. For example, one might choose an n-level supply modulator for use with the n-level supply generator of FIG. 8, with one supply modulator input connected to each output level ($V_1$-$V_n$ of the supply generator). One may also have multiple supply modulators connected to an individual supply generator.

Figure 10:
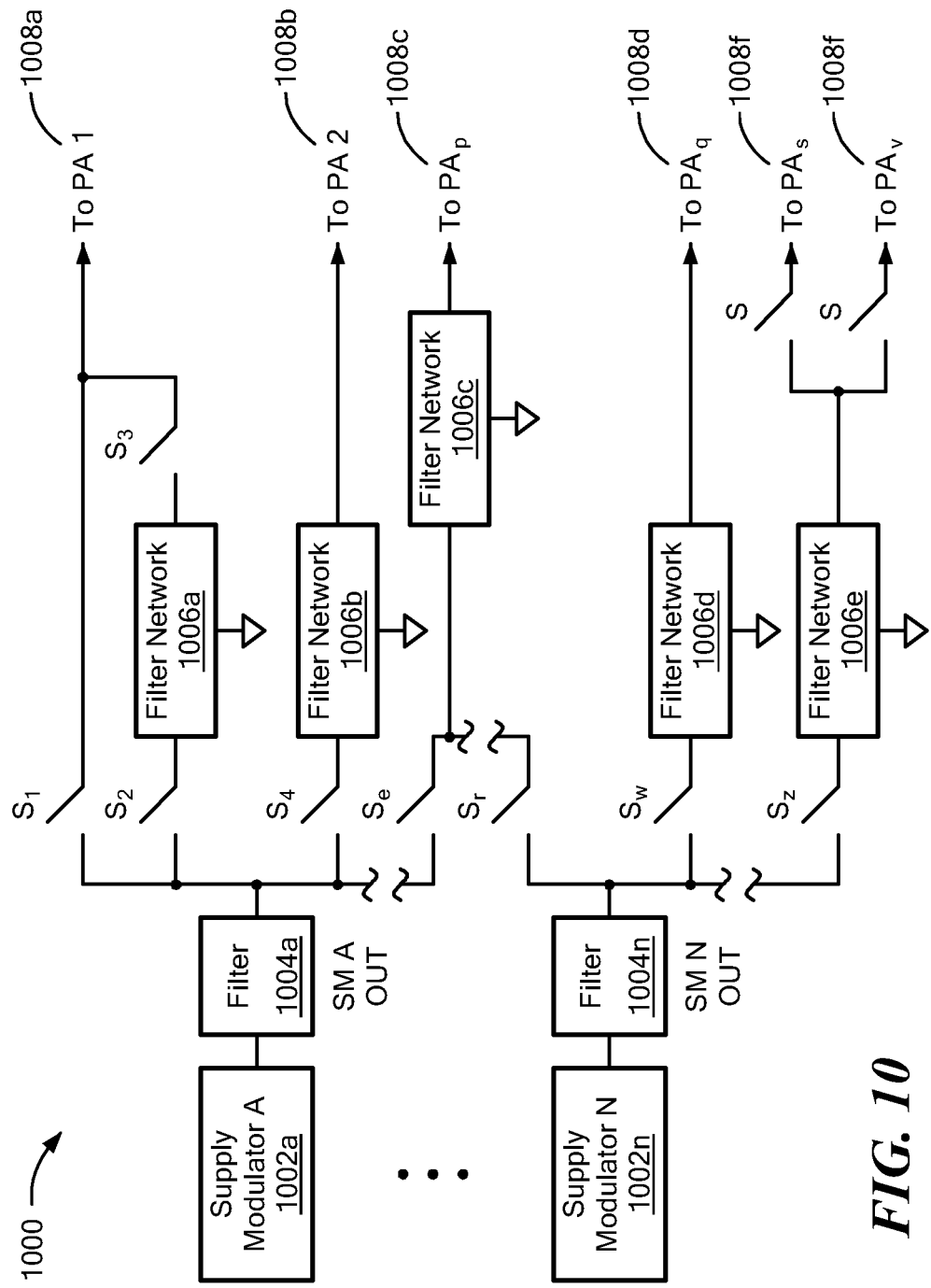
FIG. 10 is block diagram of a system illustrating exemplary ancillary subsystems incorporating switches in supply modulator systems. These include switches to route individual supply modulator outputs to one or more power amplifiers, to enable filter, energy storage, or pulse shaping networks to be connected or disconnected, and to enable the characteristics of filter networks to be dynamically reconfigured.

FIG. 10 is a block diagram of a system 1000 illustrating exemplary ancillary subsystems incorporating switches in supply modulator systems that include filter circuitry. The system 1000 includes a plurality of supply modulators 1002*a-n* that are coupled to respective filters 1004*a-n*. The filters 1004*a-n* are coupled to a switch network that includes a plurality of switches, and the switch network is coupled to a plurality of filter networks 1006*a-e*. The filters 1004*a-n* and the filter networks 1006*a-e* are sometimes collectively referred to herein as "filter circuitry." The filter circuitry is configured to receive and filter the modulator voltage provided by the respective supply modulators 1002*a-n* to provide a filtered modulator voltage. The filtered modulator voltage can be provided via one or more of the filters 1004*a-n* and/or one or more of the filter networks 1006*a-e*. The switch network operates to cause the outputs from the filters 1004*a-n* to be provided to one or more power amplifiers 1008*a-f*, in some cases via one or more of the filter networks 1006*a-e*. For example, the switch network can be used to route individual supply modulator outputs (e.g., in the form of modulator voltages and/or filtered modulator voltages) to one or more power amplifiers 1008*a-f*, to enable filter, energy storage, or pulse shaping networks to be connected or disconnected, to enable the characteristics of filter networks to be dynamically reconfigured, and/or to enable paralleling of multiple supply modulators to drive a single output. The filter networks 1006*a-e* that can be enabled by the switches can include pulse shaping networks, linear regulators, etc., to be connected or disconnected between one or more supply modulator output(s) and inputs of one or more of the power amplifiers 1008*a-f*. In some embodiments, a transistor could act as a linear regulator under some conditions and as a switch under other conditions. Such switches (including transistors used part of the time as switches) can be valuable to enable reconfiguration of the system for different operating conditions. A limitation which may be encountered in many such ancillary subsystems is that these switches must also be able to have one or both of their terminals at the highest supply generator output voltage. In the absence of a sufficiently high voltage available for gate drive, such switches must typically be implemented with PMOS devices, which imposes significant penalty on their achievable size and efficiency (as compared to if NMOS devices could be used). However, by utilizing the techniques described above, sufficient gate drive voltage can be provided such that NMOS devices can be used that require gate drive voltages above the highest available voltage provided by the supply generator. In particular, the filter circuitry (e.g., one or more of the filters 1004a-n and/or one or more of the filter networks 1006a-e) can include an NMOS transistor (e.g., a 2V or 5V NMOS device) with a gate powered by, for example, the output voltage $V_O$ 404 of FIG. 4 (or, e.g., the filtered and/or regulated output voltage $V'_O$ 416).

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the exemplary embodiments, it is understood that the present disclosure has been made only by way of example, and that numerous changes in the details of implementation of the disclosed subject matter may be made without departing from the spirit and scope of the disclosed subject matter.

Having thus described several aspects of at least one embodiment which illustrate the described concepts, systems, circuits and techniques, it is to be appreciated that various alterations, modifications, and improvements will readily occur to those skilled in the art.

Such alterations, modifications, and improvements are intended to be part of this disclosure, and are intended to be within the spirit and scope of the concepts, systems, circuits and techniques described herein. Further, though advantages of the concepts, systems, circuits and techniques described herein are indicated, it should be appreciated that not every embodiment of the example systems, circuits and techniques described herein will include every described advantage. Some embodiments may not implement any features described as advantageous herein and in some instances one or more of the described features may be implemented to achieve further embodiments. Accordingly, those of ordinary skill in the art will appreciate that the foregoing description and drawings are by way of example only.

Various aspects of the concepts, systems, circuits and techniques described herein may be used alone, in combination, or in a variety of arrangements not specifically discussed in the embodiments described herein and is therefore not limited in its application to the details and arrangement of components set forth in the description or illustrated in the drawings. For example, aspects described in one embodiment may be combined in any manner with aspects described in other embodiments.

Also, the concepts, systems, circuits and techniques described herein may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections are set forth between elements in the above description and in the drawings. These connections, unless specified otherwise, can be direct or indirect, and the described concepts, systems, devices, structures and techniques are not intended to be limiting in this respect. Accordingly, reference to coupled elements or a coupling of elements can refer to either a direct or an indirect coupling.

As an example of an indirect relationship, references in the present description to coupling element "A" to element "B" include situations in which one or more intermediate elements (e.g., element "C") is between element "A" and element "B" as long as the relevant characteristics and functionalities of element "A" and element "B" are not substantially changed by the intermediate element(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Additionally, the term "exemplary" is used herein to mean "serving as an example, instance, or illustration". Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection/coupled" can include an indirect "connection/coupling" and a direct "connection/coupling".

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

What is claimed is:

1. A circuit configured to receive a first voltage generated by a supply generator and a second voltage generated by the supply generator and generate an output voltage that is greater than both the first voltage and the second voltage, the circuit comprising:
   a first capacitor configured to charge to a voltage equal to a difference between the first voltage and the output voltage;
   a second capacitor configured to charge to a voltage equal to a difference between the first voltage and the second voltage; and
   a plurality of conductive paths coupled to the first capacitor and the second capacitor and having two states, wherein in a first state, the plurality of conductive paths are configured to cause the second capacitor to charge to the voltage equal to the difference between the first voltage and the second voltage, and wherein in a second state, the plurality of conductive paths are configured to cause the second capacitor to be connected in parallel with the first capacitor to cause the first capacitor to charge to the voltage equal to the difference between the first voltage and the output voltage,
   wherein the output voltage is provided to driver circuitry configured to power a gate of a transistor, wherein the first voltage and the second voltage are each too small to power the gate of the transistor.

2. The circuit of claim 1, wherein the output voltage is equal to the first voltage added to a difference between the first voltage and the second voltage.

3. The circuit of claim 1, wherein the output voltage is filtered, regulated, or both to produce a filtered and/or regulated output voltage, wherein the filtered and/or regulated output voltage is applied to the driver circuitry configured to power the gate of the transistor.

4. A system comprising:
   the circuit of claim 1;
   the supply generator of claim 1; and
   a supply modulator configured to receive the first voltage and the second voltage and provide a modulator voltage.

5. The system of claim 4, wherein the supply modulator includes the transistor of claim 1 that has the gate that is powered by the output voltage.

6. The system of claim 4, further comprising filter circuitry that is configured to receive and filter the modulator voltage to provide a filtered modulator voltage.

7. The system of claim 6, wherein the modulator voltage or the filtered modulator voltage is used to power an amplifier of the system.

8. The system of claim 6, wherein the filter circuitry includes the transistor of claim 1 that has the gate that is powered by the output voltage.

9. The circuit of claim 1 wherein the transistor comprises an NMOS transistor.

10. A system comprising:
    the transistor of claim 1;
    the driver circuitry of claim 1 configured to power the gate of the transistor; and
    the circuit of claim 1 coupled to apply its output voltage to the driver circuitry.

11. A circuit configured to receive a first voltage generated by a supply generator and a second voltage generated by the supply generator and generate an output voltage that is larger than the first voltage and the second voltage, the circuit comprising:
    a first capacitor that is configured to charge to a voltage equal to a difference between the first voltage and the output voltage; and
    a second capacitor configured to charge to a voltage equal to a difference between the first voltage and the second voltage,
    wherein when the first capacitor and the second capacitor are connected in parallel, the first capacitor charges to the voltage equal to the difference between the first voltage and the output voltage,
    wherein the output voltage is provided to driver circuitry configured to power a gate of a transistor, wherein the first voltage and the second voltage are each too small to power the gate of the transistor.

12. The circuit of claim 11, wherein once the second capacitor is charged, the second capacitor being connected in parallel with the first capacitor causes the first capacitor to charge to a voltage equal to the difference between the first voltage and the second voltage.

13. The circuit of claim 11, further comprising a switch network configured to connect the first capacitor and the second capacitor to the circuit in different configurations.

14. The circuit of claim 11, wherein the output voltage is equal to the first voltage added to the difference between the first voltage and the second voltage.

15. The circuit of claim 11, wherein the output voltage is filtered, regulated, or both to produce a filtered and/or regulated output voltage, wherein the filtered and/or regulated output voltage is applied to the driver circuitry configured to power the gate of the transistor.

16. The circuit of claim 11 wherein the transistor comprises an NMOS transistor.

17. A system comprising:
    the transistor of claim 11;
    the driver circuitry of claim 11 configured to power the gate of the transistor; and the circuit of claim 11 coupled to apply its output voltage to the driver circuitry.

18. A circuit configured to receive at least a first voltage generated by a supply generator and a second voltage generated by the supply generator and generate an output voltage, the circuit comprising:
- a switch network that includes a first pair of switches and a second pair of switches;
- a first capacitor configured to receive the first voltage and coupled to the switch network; and
- a second capacitor coupled to the switch network,
- wherein when the first pair of switches are open and the second pair of switches are closed, the second capacitor is configured to charge to a voltage equal to a difference between the first voltage and the second voltage, and wherein when the first pair of switches are closed and the second pair of switches are open, the second capacitor is connected in parallel with the first capacitor to generate the output voltage, and
- wherein the output voltage is greater than both the first voltage and the second voltage,
- wherein the output voltage is provided to driver circuitry configured to power a gate of a transistor, wherein the first voltage and the second voltage are each too small to power the gate of the transistor.

* * * * *